Patented Nov. 18, 1930

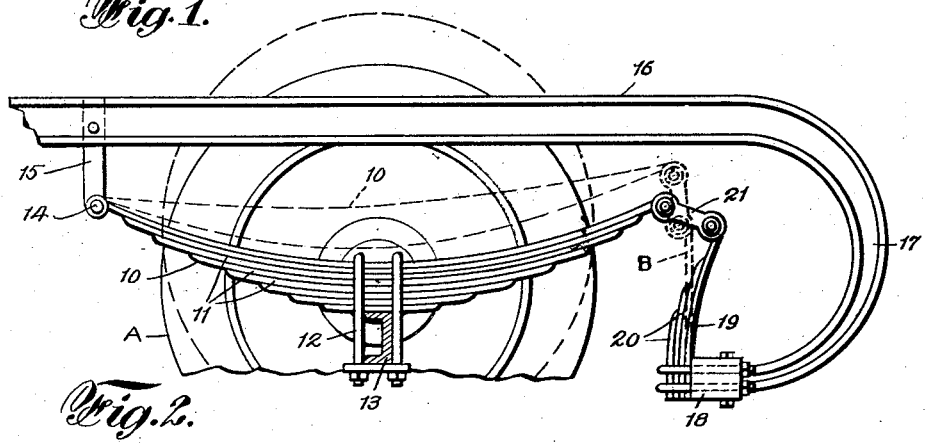

1,782,113

UNITED STATES PATENT OFFICE

WALTER J. ALBERSHEIM AND HARVEY S. KONHEIM, OF NEW YORK, N. Y.

SHOCK ABSORBER

Application filed September 2, 1926. Serial No. 133,182.

This invention relates more particularly to a class of devices for use in conjunction with vehicles.

Our invention has for its object primarily to provide a device designed to be employed on an automobile and other vehicle for supporting and cushioning the body thereof in a manner whereby the jolts and jars resulting from the vehicle passing during its travel over irregularities and contacting with obstacles in highways will be absorbed by yieldingly resisting the force of impact imposed on the wheels of the vehicle, in order to prevent or lessen the shocks due to oscillations from being imparted to the body and to the occupants.

The invention contemplates the provision mainly of a load support which is spaced above the wheel support of the vehicle. To the wheel support is fixed the central part of a laminated spring of relative rigid flexibility, and one end of this spring may be pivotally connected to the load support for positioning its other end to move upwardly and downwardly relative to the load support, or this pivotal connection may be dispensed with. Carried on the load support under one or both ends of the laminated spring is cushioning means. In one form of the device the cushioning means is connected to the end opposite to the pivot connections of the spring, and in the other form of the device each cushioning means is pivotally connected to each end of the laminated spring. Both of the cushioning means are more easily yielding to pressure than the laminated spring for yieldingly operating in longitudinal directions with the vertical movements of the spring when the vehicle is jolted by its wheels contacting with obstacles so that the initial thrust of pressure on the spring will be transmitted to and absorbed by the cushioning means to the extent of a per cent of the capacity or to the extent of the entire pressure withstanding capacity of the spring actuating means. Should the pressure be greater than the yielding capacity of the cushioning means the excess of pressure will then be assumed by the laminated spring for effectually absorbing the force of impact to avoid affecting the body.

A further object of the invention is to provide a shock absorber of a simple, efficient and durable construction which may be made in appropriate sizes and shapes.

With these and other objects in view, the invention will be hereinafter more fully explained with reference to the accompanying drawing forming a part of this specification in which similar characters of reference indicate corresponding parts in all the views, and will then be pointed out in the claims at the end of the description.

In the drawing, Figure 1 is an elevation, partly fragmentary and partly in section, of one form of our improved shock absorber applied to the axle of one of the wheels of a vehicle.

Fig. 2 is an elevation, partly fragmentary and partly in section, of a modified form of the shock absorber.

Fig. 3 is an elevation, partly fragmentary and partly in section, of still another modified form of the device, and Fig. 4 is a diagrammatic view showing an approximation in inches of the movements of the main spring and an approximation in pounds of the action of the cushioning means of the device when the vehicle is subjected to shocks or jars.

The form of the device illustrated in Fig. 1 has a main laminated spring 10 preferably of a semi-elliptic shape which is constructed in the usual fashion of a suitable number of spring metal leaves 11 to provide the spring of sufficient strength for being capable of properly supporting in suspension the body, not shown, of an automobile or other vehicle on which the device is used, and the leaves 11 are tensioned to render a relatively rigid flexibility to the spring. Part of the laminated spring 10 intermediate its ends is secured by straps, as 12, or otherwise to the axle 13 of the wheel A, and one end of the spring is pivotally connected, at 14, to a bracket 15 which depends from a load support 16 in the form of one of the frame channels or beams of the chassis of the vehicle so that the second end of the spring may yieldingly move upwardly and downwardly relative to the load support or beam 16. The end of the frame beam 16 at the second end of the spring 10 is bent or curved downwardly, as at 17, to a suitable distance below the spring. The bracket 15 positions the laminated spring 10 above the wheel support or axle 13 and below the frame beam 16 for allowing the second end of the spring to move some distance vertically toward and from the beam and toward and from the curved member 17 of the beam.

To the free end of the curved member 17 of the beam 16 is bracketed, at 18, the lower end of a spring 19 which serves as cushioning or spring actuating means. The spring 19 is of a laminated quarter-elliptic shape extending upwardly toward the end of the laminated spring 10 opposite to the pivot 14. The spring 19 is preferably formed with a less number of spring metal leaves 20 than the number of leaves of the spring 10 to tension the spring 19 for being more easily yielding to pressure than the spring 10, and the spring 19 is curved in a longitudinal direction away from the upward curvature of the spring 10 so that pressure when imposed on the spring 19 against its tension will yieldingly bend toward the spring 10. The upper end of the spring 19 is pivotally connected by a shackle or link 21 to the end of the spring 10 opposite to the pivot 14, and the positions of the opposing ends of the springs 10 and 19 are such that the shackle 21 is disposed on an incline, as shown.

When the laminated spring 10 is subjected to a load as a shock or jar which may be caused by the wheel of the vehicle contacting with an irregularity or obstacle in the highway on which the vehicle is travelling the pressure upon the spring 10 will cause it to move upwardly. The shackle 21 will then move from its inclined position toward a position corresponding with a vertical line, and the initial thrust of pressure upon the spring 10 will be deflected to the spring 19 because of being less resisting to pressure. The cushioning means spring 19 will then take a flexing movement in a longitudinal direction against its tension toward the spring 10 in accordance with the strain of pressure thereon until the spring 19 has moved a distance whereby the link 21 is in substantial alignment with the spring 19, as shown at B Fig. 1. The movement of the spring 19 to the position B indicates that it is under its maximum pressure withstanding capacity, and should the weight of the load or pressure exceed the capacity of the spring 19 the excess of pressure will then be assumed by the spring 10 for effectually absorbing the force of impact of a shock or jar on the wheels of the vehicle to avoid transmission of the shock to the body of the vehicle.

The form of the device shown in Fig. 2 has the main semi-elliptic laminated spring 22 which is constructed of spring metal leaves 23 tensioned to provide the spring of relative rigid flexibility. The central part of the spring 22 is bracketed, at 24, to one of the wheel supports or axles 25 of the vehicle, and spaced above the axle 25 and spring 22 is one of the load supports or channel beams 26 of the frame of the chassis of the vehicle. One of the ends of the channel beam 26 is curved downwardly, as at 27, in somewhat a semi-circular fashion to provide a supporting member, and this bent end or supporting member is of such a curvature that its free end is spaced some distance under and nearly on a vertical line with one of the ends of the laminated spring 22. To part of the beam 26 above the second end of the spring 22 is fastened, at 28, one end of a downwardly curved substantially semi-circular bracket or supporting member 29, and the curvature of this bracket is such that its free end is also spaced some distance below and nearly on a vertical line with the second end of the spring 22. The supporting member 27 and the bracket 29 are of similar sizes so that their free ends are on the same longitudinal plane. On the free end of the supporting member 27 of the beam 26 is bracketed, at 30, the lower end of cushioning or spring actuating means in the form of a spring 31 of a laminated quarter-elliptic type, and this spring extends upwardly toward and in spaced relation laterally to and below the end of the spring 22 above the member 27. The spring 31 is composed of a less number of spring metal leaves 32 than the spring 22 to tension the spring 31 for being more easily yielding to pressure than the spring 22. The upper end of the spring 31 and the opposed end of the spring 22 are pivotally connected by a shackle or link 33 which is disposed on a slight upward incline because of the related position of the opposing ends of the springs 22 and 31. To the free end of the bracket 29 of the beam 26 is bracketed, at 34, the lower end of a spring 35 which serves as cushioning or spring actuating means. The spring 35 is also of a laminated quarter-elliptic type extending upwardly toward and in spaced relation laterally to and below the end of the spring 22 above the bracket 29. The spring 35 is also formed of a less number of spring metal leaves 36 than the spring 22 for tensioning the spring 35 so that it is more easily yielding to pressure than the spring 22. The upper end of the spring 35 and the second end of the spring 22 are pivotally connected by means of a shackle or link 37 which is disposed like the shackle 33 on a slight upward incline in conformity to the normal inclined related positions of the opposing ends of the springs 22 and 35. The springs 31, 35 are preferably of similar tension, and the combined tension of both of these springs is less than the tension of the spring 22.

The laminated spring 22 will move upwardly when under the pressure of a load as a jolt which may be caused by the wheel of the vehicle contacting with an irregularity or obstacle in the highway on which the vehicle is travelling. With the upward movement of the spring 22 the shackles 33, 37 will also move toward vertical positions, and the initial thrust of pressure upon the spring 22 will be deflected to the springs 31, 35 by reason of being less resisting to pressure. The springs 31, 35 will yieldingly move against their tension in longitudinal directions toward the spring 22 in proportion to the force of pressure imposed upon the spring 22. Should the pressure upon the spring 22 be equal to or exceed the load withstanding capacity of both of the springs 31, 35 these springs will move as far as the vertical lines of upward and downward movements of the ends of the spring 22, as shown in dotted lines at C, D Fig. 2. When the springs 31, 35 have moved to these positions which represent their maximum load carrying capacity they will cease to further function, and the excess of pressure will then be assumed by the spring 22 to prevent the force of the shock or jar from being transmitted to the body of the vehicle.

In Fig. 3 is illustrated a form of the device having the main laminated spring 38 of a semi-elliptic shape, and this spring is composed of spring metal leaves 39 which are tensioned to also provide the spring of relative rigid flexibility. The central part of the spring 38 is bracketed, at 40, to the axle or support 41 of the wheel A of an automobile or other vehicle, and spaced above the spring 38 and axle 41 is one of the load supports or channel beams 42 of the frame of the chassis of the vehicle. The channel beam 42 is of a length and so positioned that one of its ends extends considerable distance beyond one of the ends of the spring 38, and this end of the beam is bent downwardly preferably at a right angle, as at 43. The bent end 43 of the beam 42 terminates at a point below the opposed end of the laminated spring 38, and in this bent end is an aperture 44. To part of the beam 42 between the bent end 43 and the spring 38 is fastened, at 45, the upper end of a depending bar or bracket 46, and in this bracket is an aperture 47 alined with the aperture 44 of the bent end 43 of the beam. In the apertures 44, 47 is a slidable rod 48 having a threaded end portion 49 which is movable in the aperture 44 of the bent end 43 of the beam. On the other end of the rod 48 is a head, as 50, of a size to provide a shoulder or stop 51 which abuts against the bracket 46 to limit the movement of the rod 48 inwardly of the aperture 44 toward the space between the bracket 46 and the bent end 43 of the beam 42. The head 50 of the rod 48 is of such a length that its free end terminates at a point in spaced relation to and on a downward incline from the opposing end of the spring 38. The head 50 of the rod 48 is pivotally connected to one end of the spring 38 by a shackle or link 52 which is disposed on an upward incline, as shown. Encircling the part of the rod 48 between the bracket 46 and the bent end 43 of the beam 42 is a spiral spring 53 having its ends pressing against the bracket 46 and against a collar or abutment 47 which is adjustable on the rod. On the threaded portion 49 of the rod 48 may be one or a number of nuts 54 for being rotated to move the collar 47 to vary the tension of the spring 53 as occasion requires by contracting or allowing the spring to expand. The spring 53 at all times is tensioned for being more easily yielding to pressure than the laminated spring 38 and for serving to force the rod 48 yieldingly in a direction from the spring 38. To part of the channel beam 42 above the second end of the spring 38 is secured, at 55, the upper end of a depending bar or bracket 56 of such a length that its lower end terminates slightly below the second end of the spring 38, and to the lower end of the bracket 56 is pivotally connected at 57 the second end of the spring 38.

When the pressure of a shock or jar is imposed on the laminated spring 38 by the wheel of the vehicle striking an obstacle or moving over an irregularity in a highway the wheel axle 41 and spring 38 will take upward movements, and the shackle 52 will also be swung upwardly toward a vertical line, as indicated, at E Fig. 3. With this movement of the shackle the rod 48 will move toward the spring 38 against the tension of the spring 53, and since the spring 53 is less resisting to pressure than the spring 38 the initial thrust of pressure upon the spring 38 will be deflected to the spring 53. Should the force of the pressure be sufficient to move the head 50 of the rod 48 and to move the shackle 52 to the approximate vertical position E the pressure withstanding capacity of the spring 52 will then be reached, and the excess pressure if any will be assumed by the laminated spring 38 to take up the impact for preventing the shock from affecting the body of the vehicle.

In the diagrammatic view shown in Fig. 4 the operation of the device is approximated by the upward movements of the main spring being measured by inches, as F, according to the force of pressure imposed thereon when the wheel strikes an obstruction and by the curvature of the flexing movements of the cushioning means of the device being measured by pounds, as G. For example, if the pressure of 200 pounds is imposed on the device the main spring F will move upwardly four inches and the initial thrust of pressure will cause the cushioning means G to take the line of curvature, as indicated at H. If the pressure is 400 pounds the spring will move five inches with the cushioning means taking the line of curvature, as at I, and the ratio of further operation of the main spring and cushioning means will be in proportion when the device is subjected to greater pressure, though asymptotically the line of maximum flexing movement of the cushioning means never reaches the point corresponding exactly to a true vertical line as the main spring operates to assume the pressure of the load when in excess of the capacity of the cushioning means.

In the foregoing description we have embodied the preferred form of our invention, but we do not wish to be understood as limiting ourselves thereto as we are aware that modifications may be made therein without departing from the principle or sacrificing any of the advantages of this invention, therefore, we reserve to ourselves the right to make such changes as fairly fall within the scope thereof.

Having thus described our invention, we claim as new and desire to secure by Letters Patent:—

1. The combination with a vehicle frame, of an axle, a laminated spring supported intermediate its ends by said axle, cushioning means connected between one end of said laminated spring and said frame, said means comprising a vertical laminated spring member, a link pivoted to said last mentioned spring member, said link lying normally in a substantially horizontal plane and said link being connected to said first mentioned laminated spring, whereby said link and said vertical spring are brought into substantially vertical alignment before the said first mentioned spring is substantially strained by variations in pressure between said axle and said frame.

2. The combination with a vehicle frame, of an axle, a laminated spring supported intermediate its ends by said axle, cushioning means connected between one end of said laminated spring and said frame, said means comprising a toggle device one of whose links is a spring member lying in a substantially vertical plane, and means connecting the other end of the laminated spring to said frame.

3. The combination with a vehicle frame, of an axle, a laminated spring supported intermediate its ends by said axle, and separate cushioning means connected between each end of said laminated spring and said frame, each of said means comprising a toggle device one of whose links is a spring member.

This specification signed this 1st day of September, A. D. 1926.

WALTER J. ALBERSHEIM.
HARVEY S. KONHEIM.